Figure 1:
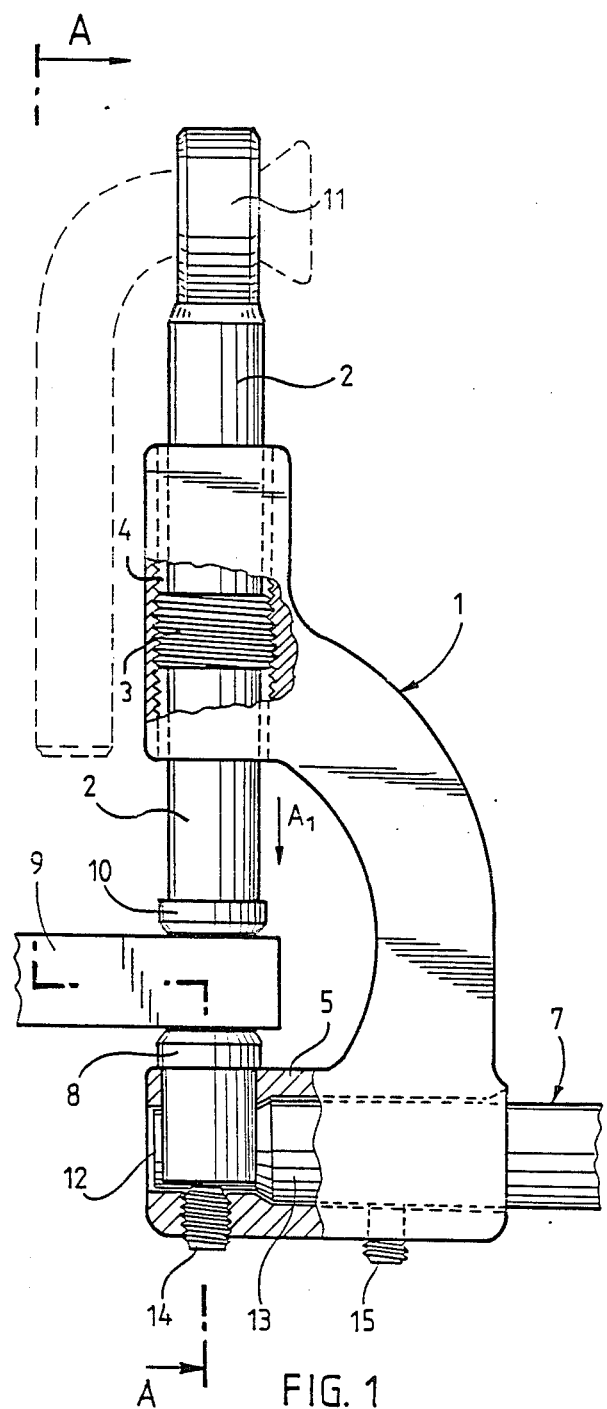

United States Patent [19]

Saarinen

[11] Patent Number: 4,778,413

[45] Date of Patent: Oct. 18, 1988

[54] GROUND CLAMP FOR A WELDING APPARATUS

[76] Inventor: Reino Saarinen, Nummenpuistokatu 7, SF-20540 Turku, Finland

[21] Appl. No.: 43,834

[22] Filed: Apr. 28, 1987

[51] Int. Cl.$^4$ ............................................. H01R 4/30
[52] U.S. Cl. .................................. 439/803; 439/810; 439/919
[58] Field of Search ............... 439/92, 791, 792, 803, 439/810–814, 919

[56] References Cited

U.S. PATENT DOCUMENTS

| | | | |
|---|---|---|---|
| 2,420,895 | 5/1947 | Merriman | 173/273 |
| 2,461,687 | 2/1949 | Hopfeld | 173/273 |
| 3,363,219 | 1/1968 | Hubbard et al. | 439/803 X |
| 4,040,714 | 8/1977 | Grover et al. | 439/803 |
| 4,083,624 | 4/1978 | Timmer | 439/803 |

FOREIGN PATENT DOCUMENTS 548118  4/1974  Switzerland .

*Primary Examiner*—Eugene F. Desmond
*Attorney, Agent, or Firm*—Ladas & Parry

[57] ABSTRACT

The invention relates to a ground clamp for a welding apparatus. The ground clamp comprises a fastening screw rotatable in a body and a counter jaw formed in the body, which fastening screw and jaw together form a screw clamp by means of which the ground is fastened to a workpiece. The ground clamp further comprises a connection for fastening a ground cable to the body. Known ground clamps have structural disadvantages on account of which they are not reliable in operation and do not conduct sufficiently current in proportion to their size. The disadvantages are due to the fact that the contact between the workpiece and the ground cable is not sufficiently good to guarantee an even flow of the electric current. For the elimination of these disadvantages the connection of the ground cable comprises a cavity formed in the counter jaw perpendicular to the direction of the movement of the fastening screw, and fastening means which lock both a naked part of the ground cable and a cable insulation in the cavity.

7 Claims, 1 Drawing Sheet

GROUND CLAMP FOR A WELDING APPARATUS

BACKGROUND OF THE INVENTION

The invention relates to a ground clamp for a welding apparatus. The ground clamp comprises a fastening screw rotatable in a body and a counter jaw formed in said body, said fastening screw and said jaw together forming a screw clamp by means of which the ground clamp is fastened to a workpiece.

Prior ground clamps for a welding apparatus are fastened to a workpiece either by means of a spring or by means of a screw. The lack of press force is one disadvantage of ground clamps provided with a spring, and this lack is solely due to the structure of the ground clamp. Even a rigid spring is made inoperative by a small amount of welding slag. As a result, no proper contact can be obtained with the workpiece. In principle, a ground clamp provided with a screw provides a greater press force, the ground clamp according to the invention being of this particular type. However, the connection of the ground cable and the screw are so positioned with respect to each other in this type of ground clamps that a sufficient press force cannot be obtained. In some of these clamps, the poor contact between the workpiece and the ground clamp is also due to the fact that the jaws of these clamps are cogged or rounded so that their contact surfaces are small. On the other hand, prior ground clamps have drawbacks in the connection between the cable and the body of the clamp. The cable is liable to fracture at the connecting point, as a result of which the cable strands are broken.

Especially, the poor contact between the clamp and the workpiece, which is due to the low press force and the small contact surfaces, and also the broken cable strands cause the prior ground clamps to be heated up much earlier than the welding current obtains the value for which the clamps in principle are dimensioned. On account of this they cannot be operated with their full nominal current. Due to the insufficient press force in particular, but possibly also due to the broken cable strands or the weak cable connection, sudden variations occur in the welding current at the working site when a person passing by accidentally kicks the ground cable. This sudden change in the contact between the ground cable and the workpiece causes a change in the welding current, which change, in turn, affects adversely the welding result.

As appears from the above, prior ground clamps have structural disadvantages on account of which they are not reliable in operation and cannot conduct sufficiently current in proportion to their size. The disadvantages are due to the fact that the contact between the workpiece and the ground cable in these clamps is not sufficiently good to guarantee an even flow of the electrical current.

DISCLOSURE OF THE INVENTION

The object of the invention is thus to provide a ground clamp by means of which the above disadvantages can be avoided and a definite and an even flow of current can be guaranteed under all conditions. This is achieved by means of a ground clamp of the kind described above, which ground clamp comprises further a connection for fastening a ground cable to said body, said connection comprising a cavity formed in said counter jaw perpendicular to the direction of the movement of said fastening screw; and fastening means which lock both a naked part of the ground cable and a cable insulation in said cavity.

The basic idea of the invention is thus that a proper contact both between the cable and the clamp and between the clamp and the workpiece is guaranteed by means of a sufficient press force and a reliable cable connection.

By virtue of the great press force of the ground clamp according to the invention, the welding slag possibly present under the jaws on the surface of the workpiece is ground off, so that the contact between the workpiece and the clamp is improved. The sufficient press force and the reliable cable connection ensure that both the clamp and the cable remain steadily in place even though the cable should be kicked by accident.

Furthermore, it is very advantageous according to the invention that a stud extends into the cavity, the upper surface of which stud forms that surface of the counter jaw which is to be pressed against the workpiece, the lower surface being pressed against the naked part of the cable. The stud, preferably made of copper or chrome-alloyed copper, ensures that a major part of the current flows to the workpiece directly through the stud and not, for instance, through the clamp body or the threads of the fastening screw, i.e. the stud provides a controlled transmission path for the current.

A BRIEF DESCRIPTION OF THE DRAWINGS

Figure 2:
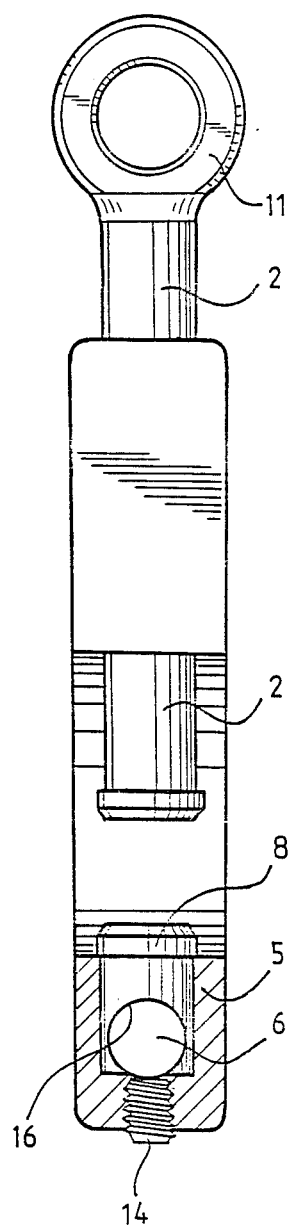

In the following the invention will be described in more detail with reference to the example of the attached drawing, wherein FIG. 1 is a partial section of a ground clamp with its cable when fastened to a workpiece, FIG. 2 illustrates the ground clamp of FIG. 1 seen in the direction of the arrows A—A, but without the workpiece and the cable.

A DETAILED DESCRIPTION OF THE INVENTION

FIGS. 1 and 2 show a ground cable which comprises a body 1 preferably of steel and a fastening screw 2 which can be rotated in the body 1 by means of threads 3 provided thereon and counter threads 4 provided on the body 1. A counter jaw 5 is formed in the body, and the counter jaw, in turn, is provided with a cavity 6 which is perpendicular to the direction of the movement of the fastening screw 2, which direction is indicated by the arrow $A_1$. In FIG. 1, a gound cable 7 is positioned in the cavity 6, whereas the cavity 6 shown in FIG. 2 is empty. A stud 8 extends from the upper surface of the counter jaw 5 into the cavity 6, which stud forms that surface of the counter jaw which is to be pressed against a workpiece 9. Another stud 10 is provided at that end of the fastening screw 2 which is to be positioned against the workpiece 9, which stud is to be pressed against the other surface of the workpiece 9. The upper end of the fastening screw is provided with a ring 11 by means of which the welder fastens the ground clamp to the workpiece. The cable 7 to be fastened and the fastening screw 2 are so positioned with respect to each other that the fastening screw can be tightened from the ring 11 by means of a torque arm, such as a slag pick. In an alternative embodiment the ground clamp can be provided with a lever which is undetachably and pivotably fastened to the ring 11. The lever is indicated with a dashed line in FIG. 1.

As is apparent from FIG. 1, the cable 7 is inserted into the cavity 6 so deep that both a necked part 12 of the cable and a part of a cable insulation 13 are covered within the body 1 of the ground clamp. The naked part 12 comprises a copper sleeve positioned on the cable strands, which sleeve is to be positioned against the stud 8. The ground cable 7 is locked in the cavity 6 by means of fastening screws 14 and 15. The fastening screw 14 is positioned opposite to the stud 8 on the opposite side of the cavity 6 so that the force exerted when tightening the fastening screw 14 against the copper sleeve is opposite in direction as compared with the press force caused by the fastening screw 2. The other fastening screw 15 is clamped to the cable insulation 13, and it locks it in position in the cavity 6. This ensures that the cable insulation 13 is not able to slide on the cable strands, when the cable 7 is drawn.

The diameter of the stud 8 is preferably larger than the diameter of the cavity 6 and the stud is provided with a hole which is bored in such a manner as shown in FIG. 2 and the diameter of which equals to that of the cavity 6, so that the naked part 12 of the cable positioned in the cavity 6 is almost entirely surrounded by the lower surface 16 of the stud 8, which surface forms part of the surface of the cavity 6. Only the lower part of the copper sleeve is not surrounded by the stud 8 at the fastening screw 14. The stud is preferably of copper or chrome-alloyed copper, so that a good electrical conductivity as well as a certain softness are obtained, which enables a good contact with the workpiece. The upper copper stud 10 is, of course, of no practical importance for the current transmission. Since a major part of the welding current or substantially the entire welding current flows through the lower coppar stud 8, the heating of the clamp is affected by varying the size of the stud 8.

Even though the invention has been described above with reference to the example of the attached drawing, it is obvious that the invention is not restricted thereto, but it can be varied within the scope of the attached claims and the knowledge obvious to one skilled in the art. Accordingly, the body 1, for instance, could be formed of an insulating material, provided that the structure obtained thereby would be sufficiently strong, because in the ground clamp according to the invention a controlled transmission path for the current is provided from the cable 7 through the stud 8 to the workpiece 9.

What I claim is:

1. A ground clamp for a welding apparatus, comprising
   a fastening screw rotatable in a body and a counter jaw formed in said body, said fastening screw and said jaw together forming a screw clamp by means of which the ground clamp is fastened to a workpiece;
   a connection for fastening a ground cable to said body, said connection comprising a cavity formed in said counter jaw perpendicular to the direction of the movement of said fastening screw; and
   fastening means which lock both a naked part of the ground cable and a cable insulation in said cavity.

2. A ground clamp according to claim 1, wherein a stud extends into said cavity, the upper surface of which stud forms that surface of the counter jaw which is to be positioned against the workpiece and the lower surface of which is to be positioned against said naked part of the cable.

3. A ground cable according to claim 2, wherein said fastening means comprise a screw arranged to be screwed into said cavity against said naked part of the cable from the opposite side of said stud.

4. A ground clamp according to claim 3, wherein the lower surface of said stud is rounded so as to correspond to said naked part of the cable.

5. A ground clamp according to claim 3, wherein said fastening means comprise another screw which is arranged to be screwed into said cavity against said cable insulation.

6. A ground cable according to claim 2, wherein the stud is of copper.

7. A ground clamp according to claim 2, wherein said stud is of chrome-alloyed copper.

* * * * *